(12) United States Patent
Perez et al.

(10) Patent No.: US 9,289,946 B2
(45) Date of Patent: Mar. 22, 2016

(54) AUTOMATED THREE-DIMENSIONAL PRINTER PART REMOVAL

(71) Applicant: Massachusetts Institute of Technology, Cambridge, MA (US)

(72) Inventors: Alfonso Alexander Perez, West Palm Beach, FL (US); Christopher Michael Haid, Bolton, MA (US); Forrest W. Pieper, Nederland, CO (US); Mateo Pena Doll, Elk, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/157,027

(22) Filed: Jan. 16, 2014

(65) Prior Publication Data

US 2014/0220168 A1  Aug. 7, 2014

Related U.S. Application Data

(60) Provisional application No. 61/759,686, filed on Feb. 1, 2013.

(51) Int. Cl.
*B29C 67/00* (2006.01)
*B29C 37/00* (2006.01)

(52) U.S. Cl.
CPC ......... *B29C 67/0085* (2013.01); *B29C 37/0007* (2013.01)

(58) Field of Classification Search
CPC ............ B29C 67/0085; B29C 37/0007; B29C 2043/044; B29C 31/044; B29C 2043/3488; B29C 2043/3427; B29C 31/045; B29C 43/34; B29C 41/42; B29C 31/02; B05C 19/00

USPC .............. 425/375, 174.4, 444, 441, 437, 161
See application file for complete search history.

(56) References Cited

U.S. PATENT DOCUMENTS

| | | | |
|---|---|---|---|
| 4,491,559 A * | 1/1985 | Grab et al. | 419/36 |
| 5,340,656 A * | 8/1994 | Sachs et al. | 428/546 |
| 5,730,817 A * | 3/1998 | Feygin et al. | 156/64 |
| 7,690,909 B2 * | 4/2010 | Wahlstrom | 425/375 |
| 8,119,053 B1 * | 2/2012 | Bedal et al. | 264/308 |
| 8,454,880 B2 * | 6/2013 | Maalderink | 264/401 |

(Continued)

FOREIGN PATENT DOCUMENTS

| | | |
|---|---|---|
| EP | 1 759 791 A1 | 3/2007 |
| EP | 1759791 A1 | 3/2007 |

OTHER PUBLICATIONS

The International Search Report for PCT/US2014/014078 mailed on May 26, 2014.

(Continued)

*Primary Examiner* — Yogendra Gupta
*Assistant Examiner* — Emmanuel S Luk
(74) *Attorney, Agent, or Firm* — Sam Pasternack; MIT Technology Licensing Office

(57) ABSTRACT

Three-dimensional printing system with automated part removal. In one embodiment, the system includes a printing surface on which a part is made and a printing device supported for controlled movement with respect to the printing surface to print the part on the printing surface. A blade is supported for motion across the printing surface to release the part from the printing surface. The present printing system according to the invention requires fewer user steps than known in the prior art.

20 Claims, 14 Drawing Sheets

(56) References Cited

U.S. PATENT DOCUMENTS

2001/0014409 A1* 8/2001 Cohen ........................ 428/606
2007/0126157 A1 6/2007 Bredt
2012/0046779 A1 2/2012 Pax et al.
2012/0072006 A1 3/2012 Knighton

OTHER PUBLICATIONS

The International Preliminary Report on Patentability for PCT/US2014/014078 issued on Aug. 4, 2015.

* cited by examiner

AUTOMATED THREE-DIMENSIONAL PRINTER PART REMOVAL

This application claims priority to provisional application Ser. No. 61/759,686, filed on Feb. 1, 2013, the contents of which are incorporated herein by reference in their entirety.

BACKGROUND OF THE INVENTION

This invention relates to 3-D printers and more particularly to automated part removal in a 3-D printer.

3D printing, a form of additive manufacturing, is a laborious manufacturing process in its existing state. A generic prior art printer 10 shown in FIG. 1 includes a printing surface 12 and a movable carriage 14 that carries a printing device 16. The prior art system shown in FIG. 1 typically includes a tethered computer 18.

As shown in FIG. 2 prior art printers typically require six or more user steps as shown in the figure. First, a user designs a 3-D model on CAD software. The user manually then uploads a 3-D model of the part to be made to a slicing program. After the user manually calibrates 150-250 settings, the slicing program generates machine code for the 3-D printer 10. The fourth step of a process is to upload the machine code to a printing host in the form of a program on a computer or an SD card. From there, the machine code is streamed to a microprocessor on the printer 10, controlling actuation. After the printer is done printing, the part is removed manually. After inspecting the quality of the part, the user decides if the part needs to be reprinted.

A fully automated 3-D printer system requires automated part removal so as to eliminate the need for a local operator to remove a part in order to start a next job. Current automated part removal systems exist in three forms: conveyor belts, extruder head attachments, and heating/cooling the printing bed. In general the disadvantages of these systems are detrimental to the printing process and/or the removal process. Conveyor belt systems have not been successful generally because the platform is flexible, leading to warped parts. A conveyor belt with rigid tracks might provide a rather expensive solution. It is also known to attach a removal paddle or block to an extruder head. Such arrangements typically cause excessive stress on the drive train and may cause misalignment in the print nozzle leading to leveling issues. Finally, it is known to use heating/cooling to release a part from the printing surface. In such systems, the printing surface is hot during printing. Upon completion of printing the part, the plate is allowed to cool passively. Shrinkage causes the part to "pop."

SUMMARY OF THE INVENTION

In one aspect, the three-dimensional printing system according to the invention includes a printing surface on which a part is made. A printing device is supported for controlled movement with respect to the printing surface to print the part on the printing surface. A blade is supported for motion across the printing surface to release the part from the printing surface. In a preferred embodiment of this aspect of the invention, a solenoid-controlled pneumatic piston is used to move the blade. The blade may be cantilevered from a support on one side of the printing surface. Alternatively, the blade may be supported on both sides of the printing surface. For a cantilevered blade, it is preferred that the support form a compliant joint. It is also preferred that the blade have a hardened steel portion that engages the part.

In preferred embodiments, a lead screw may be provided to move the blade. Alternatively, a drive pulley driving a belt can be used to move the blade. A rack and pinion arrangement may also be employed to move the blade. In one embodiment, the blade is caused to vibrate to facilitate part removal.

In another aspect, the 3-D printing system disclosed herein includes a printing surface on which a part is printed, the printing surface including holes in an array. A printing device is supported for controlled movement with respect to the printing surface to print the part on the printing surface. Pins are arranged in an array matching the array of holes and means are provided for pushing the pins through the holes to lift the part from the surface. In one embodiment, the means for pushing the pins through the holes comprises lowering the printing surface onto the pins. Alternatively, means may be provided for pushing the pins through the hole by raising the pins.

In yet another aspect, the invention is a three-dimensional printing system including a printing surface including at least one hole beneath the part location. Compressed air is introduced through the hole to lift a part from the surface.

In still another aspect of the invention, the system includes means for vibrating the printing surface. An electromagnet may be used to vibrate the printing surface.

Many of the embodiments disclosed herein further include a helper device to remove a released part. Helpers include a compressed air jet, fixed barrier to restrain a released part and a pivoting barrier attached to a blade.

DESCRIPTION OF THE PREFERRED EMBODIMENT

Figure 1:
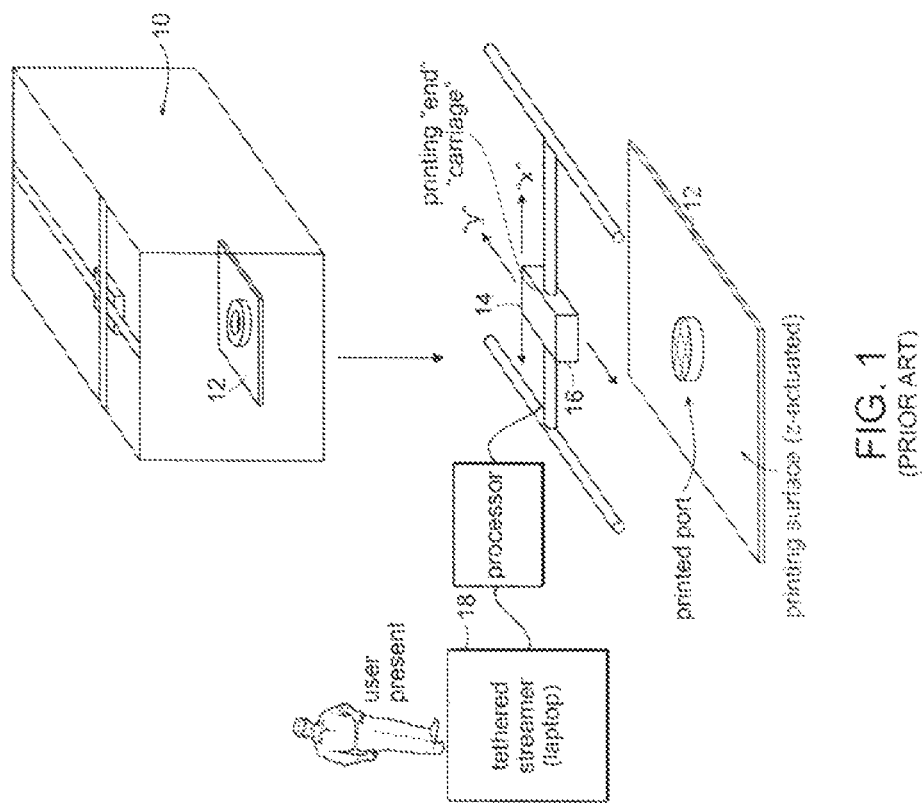
FIG. 1 is a perspective view of a prior art three-dimensional printing apparatus.
Figure 2:
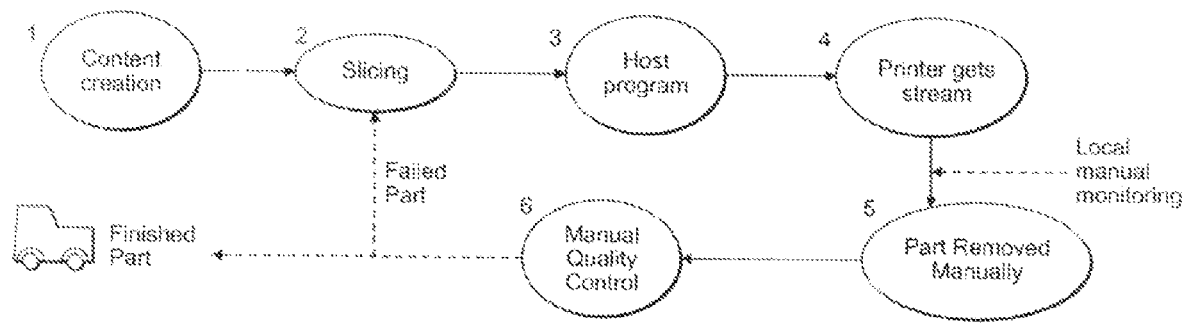
FIG. 2 is a block diagram showing user steps with regard to prior art three-dimensional printing devices.
Figure 3:
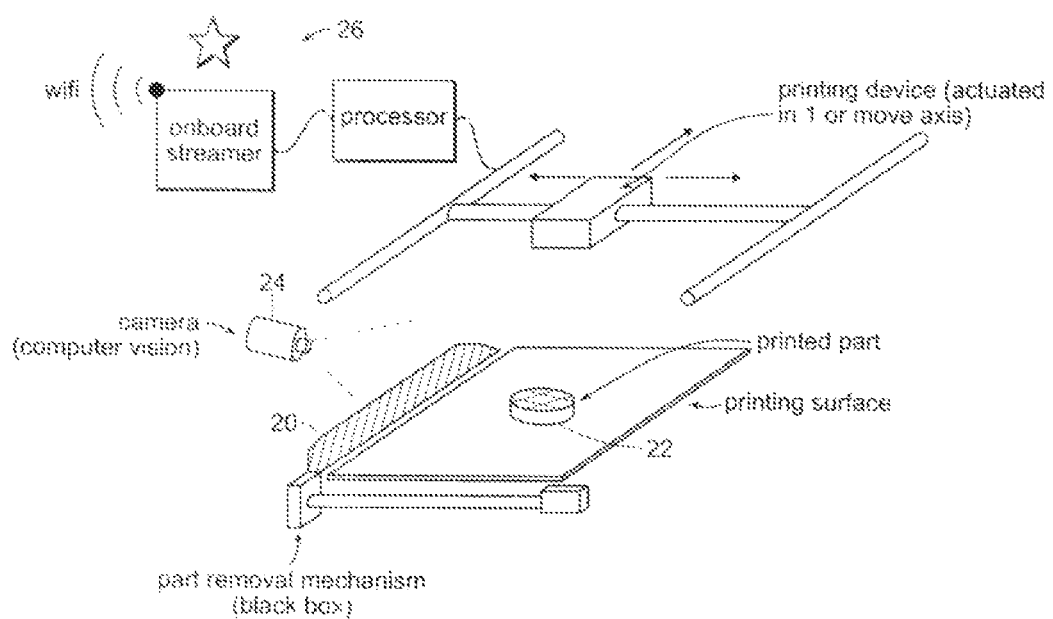
FIG. 3 is a perspective, exploded view of a printer according to an embodiment of the invention.

With reference now to FIG. 3, an embodiment of the invention includes a part removal blade 20 which can be moved to release a printed part 22. A camera 24 is provided for assessing a part during and after it has been printed. The present invention also includes an onboard host 26 that is connected to a Wi-Fi network. Software for repairing and slicing 3-D models is stored in the cloud as opposed to a computer tethered to a printer as in prior art systems. An automated queue is provided to dictate the next part that the printer will print.

Figure 4:
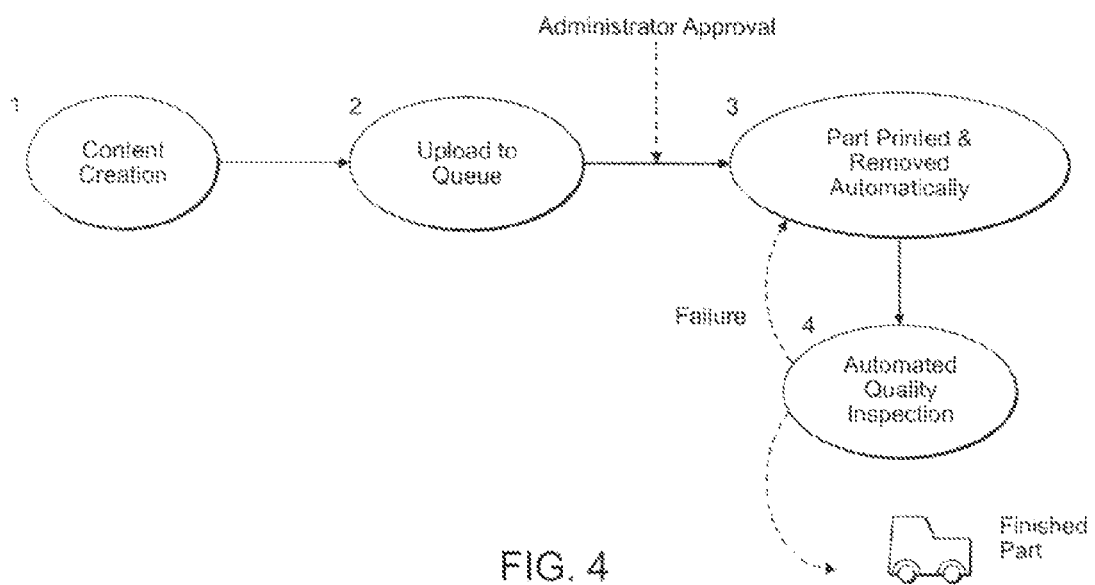
FIG. 4 is a block diagram showing the user steps in conjunction with the three-dimensional printer disclosed herein.

With reference now to FIG. 4, the system disclosed herein requires merely three user steps as opposed to the six steps discussed above with respect to prior art 3-D printers. In the present system, after content creation, a 3-D model is uploaded to the system. After an administrator approval (optional), the part is automatically repaired and sliced (machine code is generated from the 3-D model) with automatically selected slicing settings (based on two user inputs for speed versus quality and speed versus strength) in the cloud, then automatically loaded onto an automated queue for a particular printer. When the printer has reached that part on the queue, the g-code (machine code) is automatically loaded into the printer's local host program (typically on a local micro-computer), and streamed to the printer's microprocessor. As the printing process proceeds, the camera 24 monitors each 2-D layer using automated computer vision to ensure that the part is printing correctly. If the part fails at any layer, the part is automatically removed and reprinted (re-slicing with different setting occurs before re-printing if the artificial intelligence software deems it necessary). The finished part (quality inspected again by the computer vision subsystem) is removed and ready for pickup. The printer then moves on to the next part on the queue. In total, there are strictly three user steps: content creation, 3-D model upload, and finished part pickup.

Figure 5:
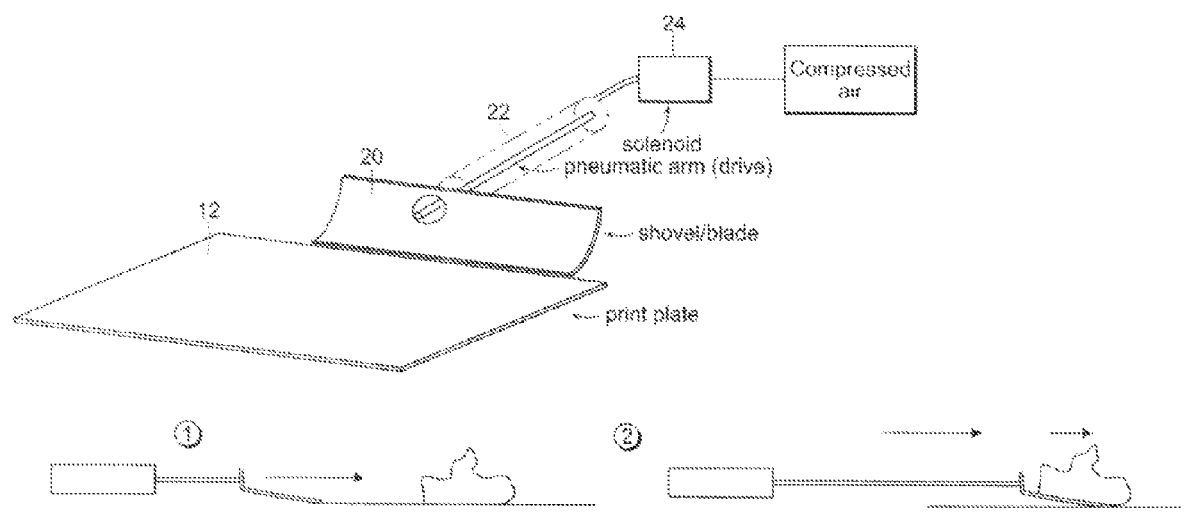
FIG. 5 is a perspective view of a shovel/blade embodiment for removing a printed part.

With reference now to FIG. 5, an embodiment of the part removal system is illustrated. A blade 20 is arranged for motion across the print plate 12 using a pneumatic piston 22 to move the plate under the motive force of compressed air controlled by a solenoid valve 24. It will be understood that the motive force moving the blade 20 is adjusted to remove a part without damaging the part.

Figure 6:
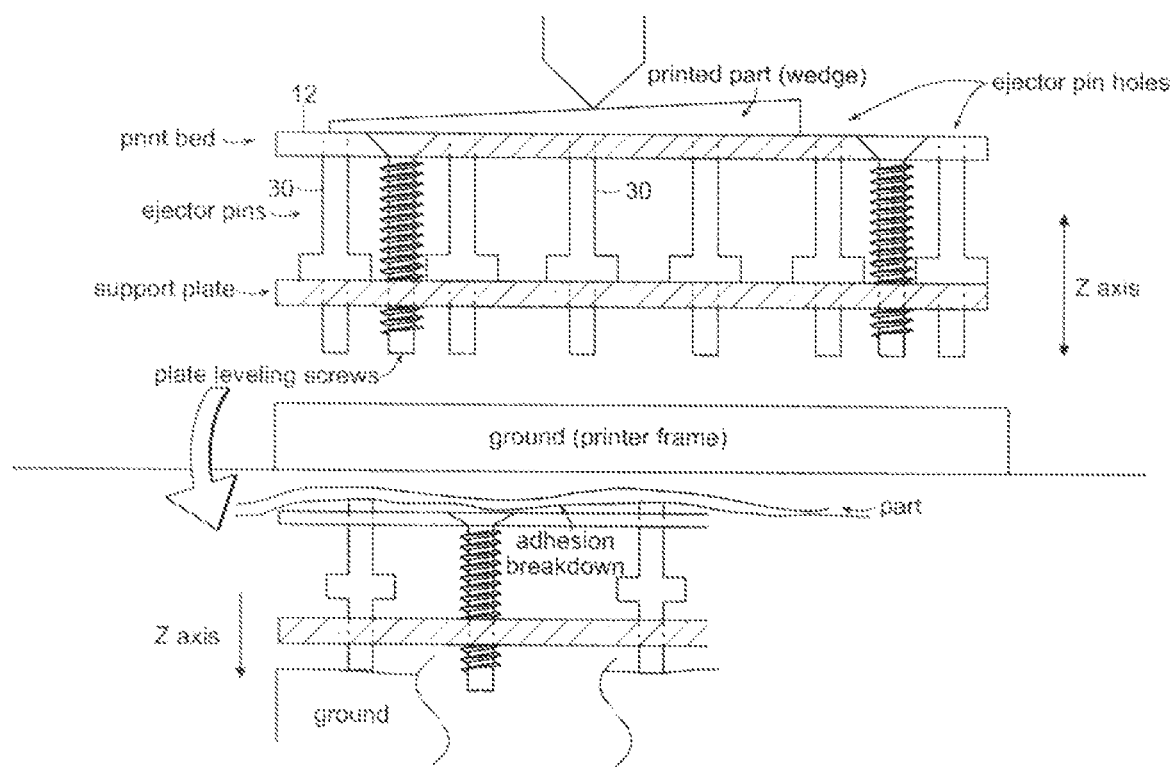
FIG. 6 is a cross-sectional view of an embodiment of the invention using pins to urge a part away from the printing surface.

Another embodiment of the part removal system disclosed herein is shown in FIG. 6. In this embodiment, holes in an array are made through the printing bed or surface 12. A plurality of ejector pins 30 are arranged beneath the print surface 12. After a part has been printed, either the print surface 12 is lowered onto the pins 30, or the pins 30 are lifted to pass through the array of holes to lift a printed part as shown in the figure.

Figure 7:
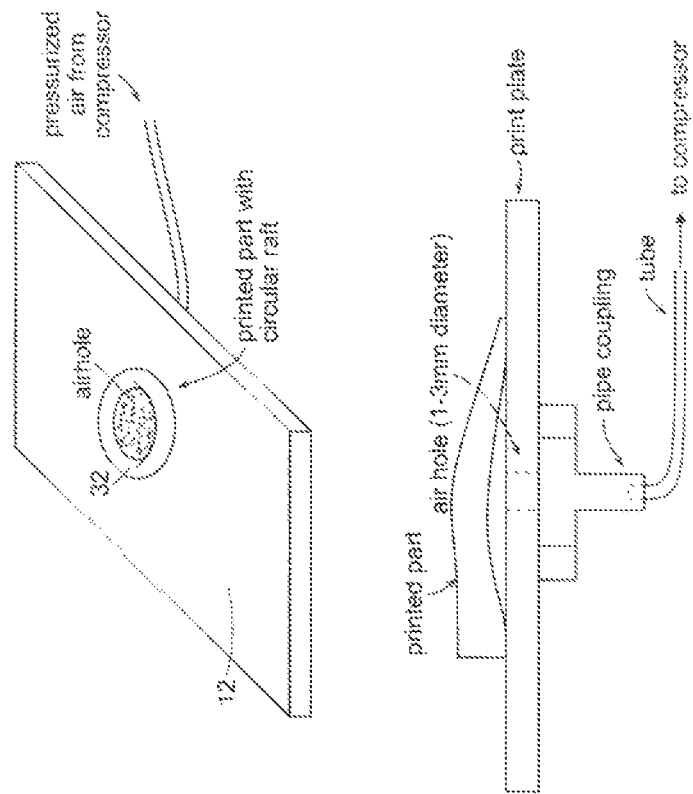
FIG. 7 is a schematic illustration of an embodiment of the invention using air pressure delivered from beneath the printing surface to release a printed part.

Yet another embodiment of the invention is shown in FIG. 7. In this embodiment, there is a hole in the print surface 12 through which air is injected from underneath the printed part. The air pressure lifts the printed part as shown in the lower portion of FIG. 7.

Figure 8:
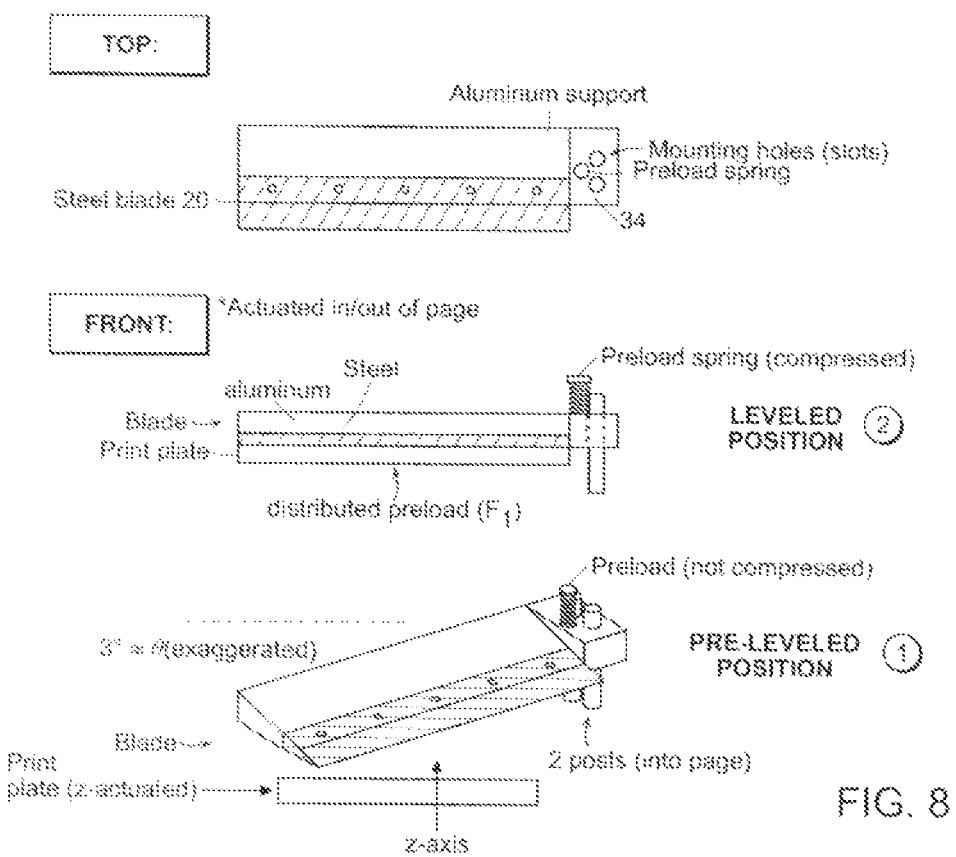
FIG. 8 constitutes views of a cantilevered blade in one embodiment of the invention.
Figure 9:
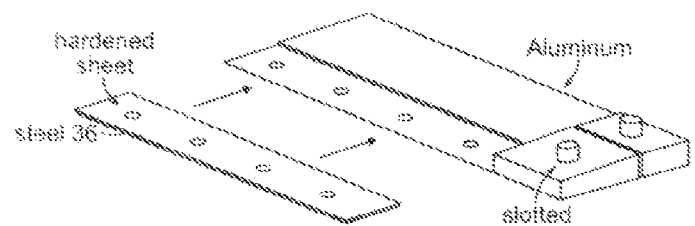
FIG. 9 is a perspective view of an aluminum support for receiving a hardened steel sheet to serve as a blade for use in the invention.

Yet another embodiment of the invention is illustrated in FIG. 8. In this embodiment, the blade 20 is cantilevered at a compliant joint 34 on one side of the unit. The blade 20 is leveled on the printing surface and moves across the printing surface to release a part. As shown in FIG. 9, it is preferred that the blade 20 have a substrate such as aluminum to which is attached a hardened steel sheet 36 to provide the part lifting capability.

Figure 10:
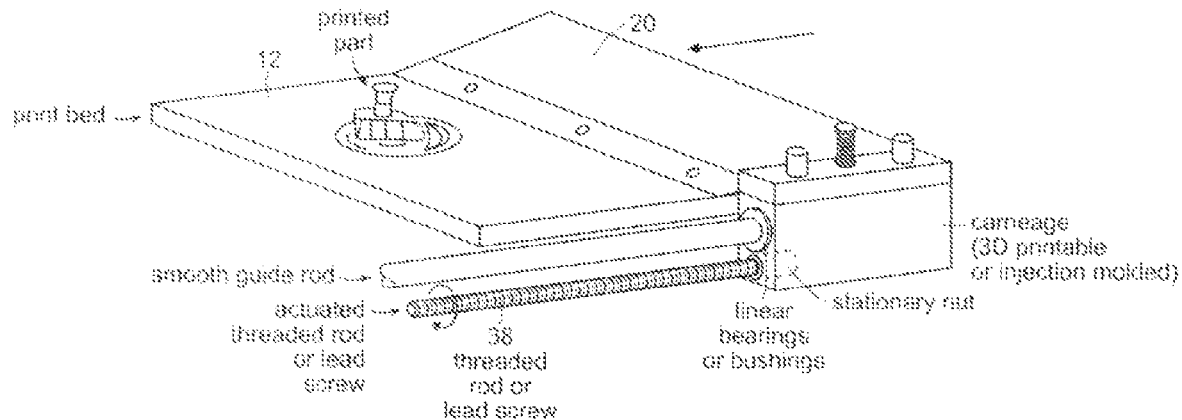
FIG. 10 is a perspective view of an embodiment of the invention using a threaded rod or a lead screw to move the blade for part removal.
Figure 11:
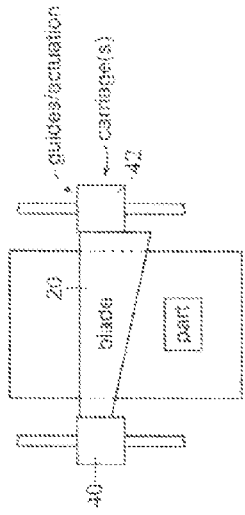
FIG. 11 is a schematic illustration showing a blade supported on both sides of the printing surface.

FIG. 10 illustrates an embodiment in which a threaded rod or lead screw 38 causes the blade 20 to traverse the printing surface 12 to engage and then remove a printed part. As shown in FIG. 11, it is contemplated that the blade 20 may be supported on both sides by guides 40 and 42.

Figure 12:
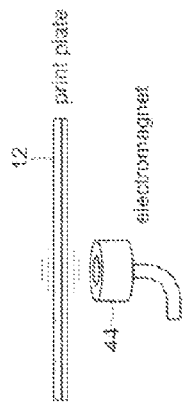
FIG. 12 is a schematic illustration of an electromagnet used to vibrate the printing surface for part removal.
Figure 13:
FIG. 13 is a schematic illustration of structure to vibrate a blade to facilitate part removal.

Yet another embodiment of the invention is shown in FIG. 12 in which an electromagnet 44 causes the print plate 12 to vibrate in a way selected to release a part printed on the print plate 12. In yet another embodiment, as shown in FIG. 13, the blade 20 itself is caused to vibrate. A motor 46 with a non-concentric weight may be provided to cause the blade 20 to vibrate.

Figure 14:
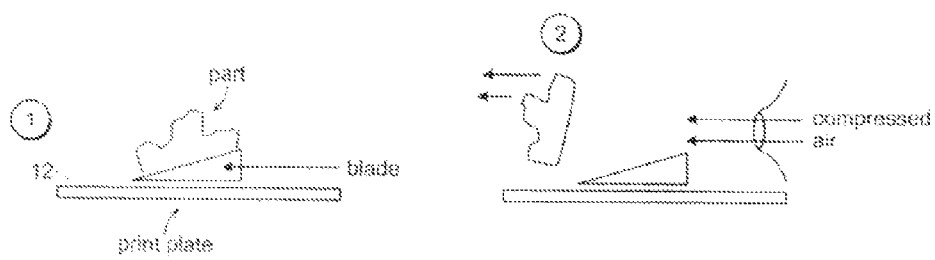
FIG. 14 is a schematic illustration of the use of compressed air to remove a released part.

After parts have been released as discussed above, compressed air may be used to remove a part from the printing surface 12 as shown in FIG. 14.

Figure 15:
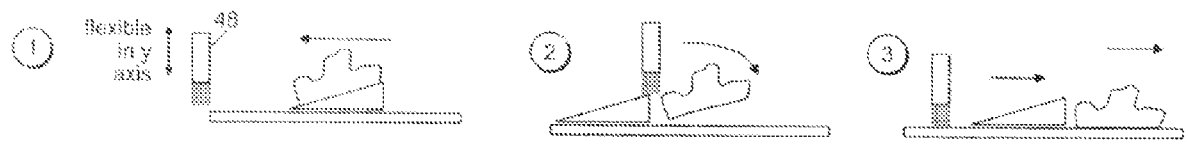
FIG. 15 is a schematic illustration of a barrier brush used to receive a released part.
Figure 16:
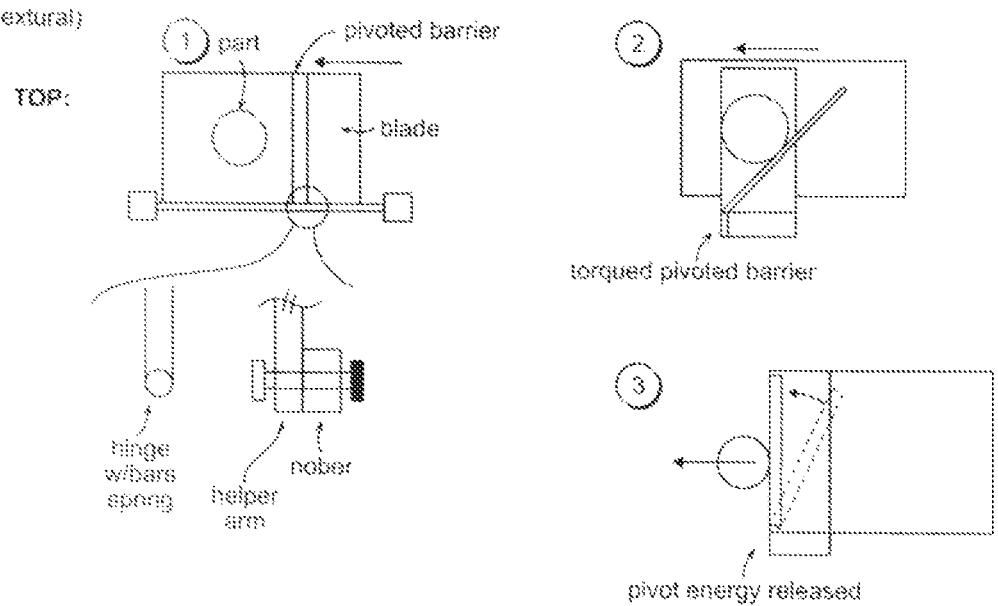
FIG. 16 constitutes views of a blade mounted spring-pivot for removing a part.
Figure 17:
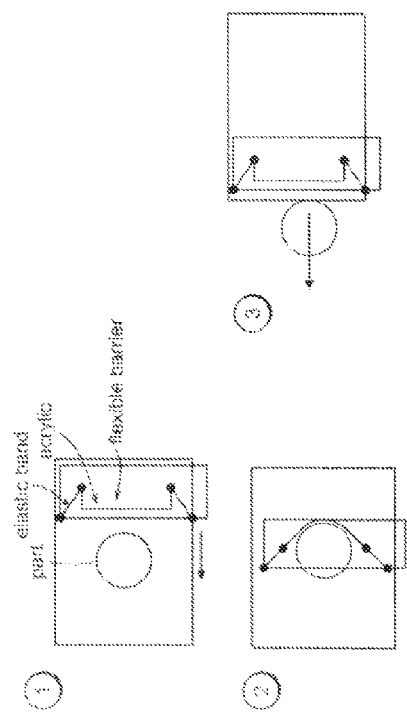
FIG. 17 is another embodiment of a flexible barrier used to remove a part.
Figure 18:
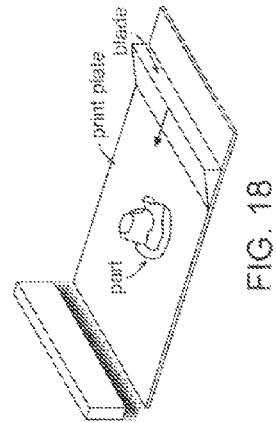
FIG. 18 shows a pivoting barrier with a fixed brush.
Figure 19:
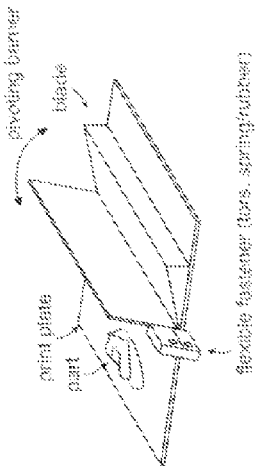
FIG. 19 is a perspective view of a pivot barrier for use in conjunction with the invention disclosed herein.

FIG. 15 illustrates a fixed brush 48 that impedes movement of a part. FIGS. 16 and 17 show additional embodiments of arrangements for removing a part that has already been released from the surface. FIG. 18 is a perspective view showing the fixed barrier. FIG. 19 shows a pivoting barrier.

Figure 20:
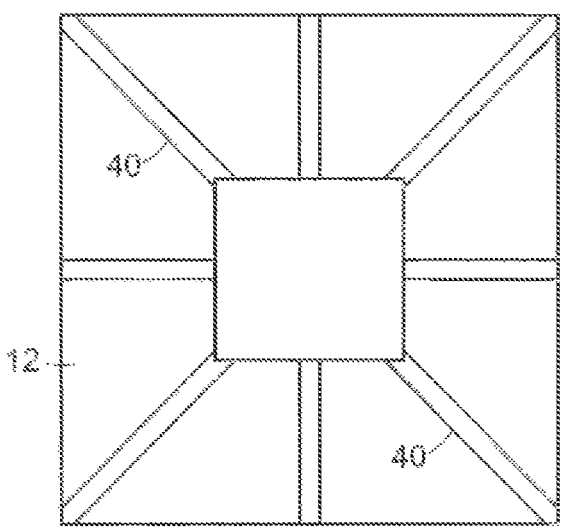
FIG. 20 is a cross-sectioned view of the underside of the print plate with grooves for kinematically coupling to a support structure.

FIG. 20 is a cross-sectional view of the underside of the printing surface 12 in one embodiment. Grooves 40 are adapted to mate with protrusions extending from the printer's support so that plate 12 will be level with respect to the support structure. The arrangement forms a kinematic coupling as is well-known to those of ordinary skill in the art. The arrangement of the grooves 40 shown in FIG. 20 allows the plate 12 to be positioned at a selected rotational orientation. It is preferred that once in place, the plate 12 be preloaded by, for example, a magnet or a spring to secure the plate 12 in the coupled position.

The present invention provides automated part removal solutions that solve the printing and removal disadvantages discussed above in conjunction with the prior art. The present invention discloses structures and methods that provide automated part removal at a much lower cost.

It is recognized that modifications and variations of the present invention will be apparent to those of ordinary skills in the art and it is intended that all such modifications and variations be included within the scope of the appended claims.

What is claimed is:

1. Three-dimensional printing system comprising:
   a printing surface on which a part is made;
   a printing device supported for controlled movement with respect to the printing surface to print the part on the printing surface; and
   a blade supported for motion only across the printing surface while remaining in contact with the printing surface throughout the motion to traverse the printing surface and to engage and release the part from the printing surface.

2. The printing system of claim 1 further including a solenoid-controlled pneumatic piston to move the blade.

3. The printing system of claim 1 wherein the blade is cantilevered from a support on one side of the printing surface.

4. The printing system of claim 1 wherein the blade is supported on both sides of the printing surface.

5. The printing system of claim 3 wherein the support forms a compliant joint.

6. The printing system of claim 1 wherein the blade has a hardened steel portion that engages the part.

7. The printing system of claim 1 further including a lead screw to move the blade.

8. The printing system of claim 1 further including a drive pulley driving belt to move the blade to remove the printed part.

9. The printing system of claim further including a rack and pinion arrangement to move the blade.

10. The printing system of claim 1 further including means to cause the blade to vibrate.

11. The printing system of claims 1 further including a helper device to remove the released part.

12. The printing system of claim 11 further including a compressed air jet to remove the released part.

13. The printing system of claims 1 further including a fixed barrier to restrain a released part.

14. The printing system of claims 1 further including a torqued pivoting barrier attached to the blade.

15. The printing system of claims 1 further including an elastic band mounted on the blade to remove a released part.

16. The printing system of claim 1 further including a computer vision system including at least one camera to detect successful part removal.

17. The printing system of claim 1 wherein the printing surface is kinematically coupled to a support structure for rapid and precise leveling of the printing surface.

18. The printing system of claim 17 further including structure to preload the printing surface with respect to the support structure.

19. The printing system of claim 18 wherein the preload structure includes a magnet.

20. The printing system of claim 17 wherein the support structure includes a plurality of protrusions extending from the support structure allowing the printing surface to assume an approximately level position at a selected rotational orientation.

\* \* \* \* \*